United States Patent
Jin et al.

(10) Patent No.: US 10,741,818 B2
(45) Date of Patent: Aug. 11, 2020

(54) CELL AND BATTERY USING SAME

(71) Applicant: CONTEMPORARY AMPEREX TECHNOLOGY CO., LIMITED, Ningde (CN)

(72) Inventors: Haizu Jin, Ningde (CN); Hu Xu, Ningde (CN)

(73) Assignee: CONTEMPORARY AMPEREX TECHNOLOGY CO., LIMITED, Ningde, Fujian Province (CN)

(*) Notice: Subject to any disclaimer, the term of this patent is extended or adjusted under 35 U.S.C. 154(b) by 56 days.

(21) Appl. No.: 16/212,446

(22) Filed: Dec. 6, 2018

(65) Prior Publication Data

US 2019/0109314 A1 Apr. 11, 2019

Related U.S. Application Data

(63) Continuation of application No. PCT/CN2017/089536, filed on Jun. 22, 2017.

(30) Foreign Application Priority Data

Jun. 27, 2016 (CN) .......................... 2016 1 0478171

(51) Int. Cl.
*H01M 2/26* (2006.01)
*H01M 4/70* (2006.01)
*H01M 10/0587* (2010.01)

(52) U.S. Cl.
CPC ............. *H01M 2/263* (2013.01); *H01M 2/26* (2013.01); *H01M 4/70* (2013.01); *H01M 10/0587* (2013.01)

(58) Field of Classification Search
CPC .......... H01M 2/263; H01M 2/26; H01M 4/70; H01M 10/0587
See application file for complete search history.

(56) References Cited

U.S. PATENT DOCUMENTS

| 2003/0186095 A1* | 10/2003 | Okutani ................ H01M 2/263 29/623.1 |
| 2010/0316897 A1* | 12/2010 | Kozuki ................... H01M 2/22 429/94 |

(Continued)

FOREIGN PATENT DOCUMENTS

CN 102683751 A 9/2012

OTHER PUBLICATIONS

Contemporary Amperex Technology Co., Limited, International Search Report (including written opinion of the internal search authority), PCT/CN2017/089536.

*Primary Examiner* — Stewart A Fraser
(74) *Attorney, Agent, or Firm* — Morgan, Lewis & Bockius LLP

(57) ABSTRACT

The present disclosure discloses a cell and a battery using the same. The cell comprises a positive electrode plate and a negative electrode plate which each are provided with an uncoated current collector, the uncoated current collector of the positive electrode plate and the uncoated current collector of the negative electrode plate each are respectively welded with an electrical conductive piece used to connect with an external circuit. The uncoated current collector of the positive electrode plate is punched to form an electrolyte transmission channel and/or the uncoated current collector of the negative electrode plate is punched to form an electrolyte transmission channel; a punching manner of the electrolyte transmission channel comprises following one manner or two manners: one manner is that an edge region of the uncoated current collector which is not aligned with the electrical conductive piece is punched to form an semi-closed channel, the other manner is that the uncoated current collector is punched to form a hole-like all-closed channel. In comparison with the technology in background, by that the uncoated current collector is punched to form the elec- (Continued)

trolyte transmission channel, electrolyte infiltration speed is improved, at the same time the rate performance and the cycle performance of the battery are promoted.

20 Claims, 10 Drawing Sheets

(56) References Cited

U.S. PATENT DOCUMENTS

| | | | |
|---|---|---|---|
| 2015/0086821 A1* | 3/2015 | Watanabe | H01M 10/0431 429/94 |
| 2015/0244017 A1* | 8/2015 | Nishinaka | H01M 4/0404 429/233 |
| 2015/0372335 A1 | 12/2015 | Jung | |

* cited by examiner

CELL AND BATTERY USING SAME

CROSS REFERENCE TO RELATED APPLICATIONS

This application is a continuation of PCT/CN2017/089536, filed on Jun. 22, 2017, which claims priority to Chinese Patent Application No. 201610478171.4, filed on Jun. 27, 2016, all of which are hereby incorporated by reference in their entirety.

FIELD OF THE PRESENT DISCLOSURE

The present disclosure relates to the field of battery, and particularly to a cell which has good infiltration effect of an electrolyte and a battery using the cell.

BACKGROUND OF THE PRESENT DISCLOSURE

Lithium-ion battery has been widely applied in new energy field due to advantages, such as high energy density, no memory effect, environmental protection free pollution and the like. In the highly competitive new energy vehicle market, each large company continuously makes developing and improving on performance and manufacturing process of the power lithium-ion battery. The cell, as a key component of the battery, is generally formed by a laminating manner or a winding manner. The winding manner is widely employed by battery manufacturing enterprises due to advantages, such as simple process, high forming efficiency, easy automation and the like.

In the winding process of the battery, generally, a positive electrode plate and a negative electrode plate each leave an uncoated current collector thereon, after the cell is formed by winding, the uncoated current collector is used to be welded with an electrode tab or a connecting piece. However, the cell with the above structure at least has two following problems: first, the uncoated current collector which is not welded with the electrode tab or the connecting piece is very easily folded during forming of the cell, thereby blocking the electrolyte transmission channel; second, a channel composed by gaps between the electrode plates, through which the electrolyte enters into the inside of the cell, is obstructed at the weld zone where the uncoated current collector is welded with the electrode tab or the connecting piece. The above two problems are not beneficial to sufficient infiltration of the cell, which allows the required standby time of the cell after the electrolyte is injected to be longer; at the same time, the electrode plate of the battery may precipitate lithium dendrite in the later stage of the cycle due to insufficient electrolyte infiltration.

Therefore, it is necessary to provide a cell which can solve the above problems and a battery using the cell.

SUMMARY OF THE PRESENT DISCLOSURE

An object of the present disclosure is to provide a cell which can effectively improve electrolyte infiltration effect to prepare a battery which has better rate performance and cycle performance.

In order to attain the above object, in a first aspect, the present disclosure provides a cell comprising a positive electrode plate and a negative electrode plate which each are provided with an uncoated current collector, the uncoated current collector of the positive electrode plate and the uncoated current collector of the negative electrode plate each are respectively welded with an electrical conductive piece used to connect with an external circuit. The uncoated current collector of the positive electrode plate is punched to form an electrolyte transmission channel and/or the uncoated current collector of the negative electrode plate is punched to form an electrolyte transmission channel; a punching manner of the electrolyte transmission channel comprises following one manner or two manners: one manner is that an edge region of the uncoated current collector which is not aligned with the electrical conductive piece is punched to form an semi-closed channel, the other manner is that the uncoated current collector is punched to form a hole-like all-closed channel.

In order to attain the above object, in a second aspect, the present disclosure provides a battery comprising a battery case, a cell and an electrolyte, the cell and the electrolyte are packaged in the battery case; the cell is the cell according to the first aspect of the cell.

In order to attain the above object, in a third aspect, the present disclosure provides a cell comprising a positive electrode plate and a negative electrode plate which each are provided with an uncoated current collector, the uncoated current collector of the positive electrode plate and the uncoated current collector of the negative electrode plate each are welded with an electrical conductive piece, the uncoated current collector of the positive electrode plate and the uncoated current collector of the negative electrode plate each are formed with a weld zone at a section thereof welded with the electrical conductive piece. At least one of the uncoated current collector of the positive electrode plate and the uncoated current collector of the negative electrode plate is provided with a hole-like all-closed channel penetrating the uncoated current collector along a thickness direction, and the all-closed channel is positioned at an inner side of the weld zone along a length direction; and/or, at least one of the uncoated current collector of the positive electrode plate and the uncoated current collector of the negative electrode plate is provided with a semi-closed channel penetrating a corner portion of the uncoated current collector along the thickness direction, and the semi-closed channel is positioned at a side of the weld zone along a width direction.

In order to attain the above object, in a fourth aspect, the present disclosure provides a battery comprising a battery case, a cell and an electrolyte, the cell and the electrolyte are packaged in the battery case; the cell is the cell according to the third aspect of the cell.

In comparison with the technology in background, the cell of the present disclosure is provided with the all-closed channel and/or the semi-closed channel, electrolyte infiltration speed is improved, at the same time the rate performance and the cycle performance of the battery are promoted.

BRIEF DESCRIPTION OF THE FIGURES

Hereinafter a cell, a battery using the cell and beneficial effect thereof according to the present disclosure will be described in detail in combination with figures and specific embodiments.

Figure 1A:
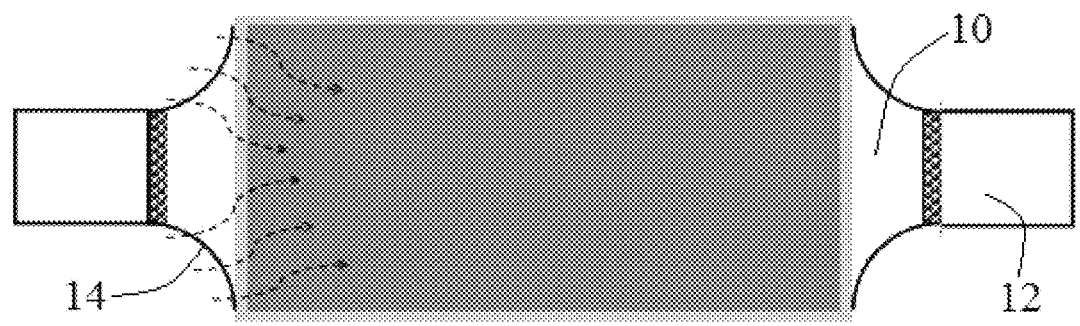
FIG. 1A is a structural schematic view of a cell of example 1 of the present disclosure.
Figure 1B:
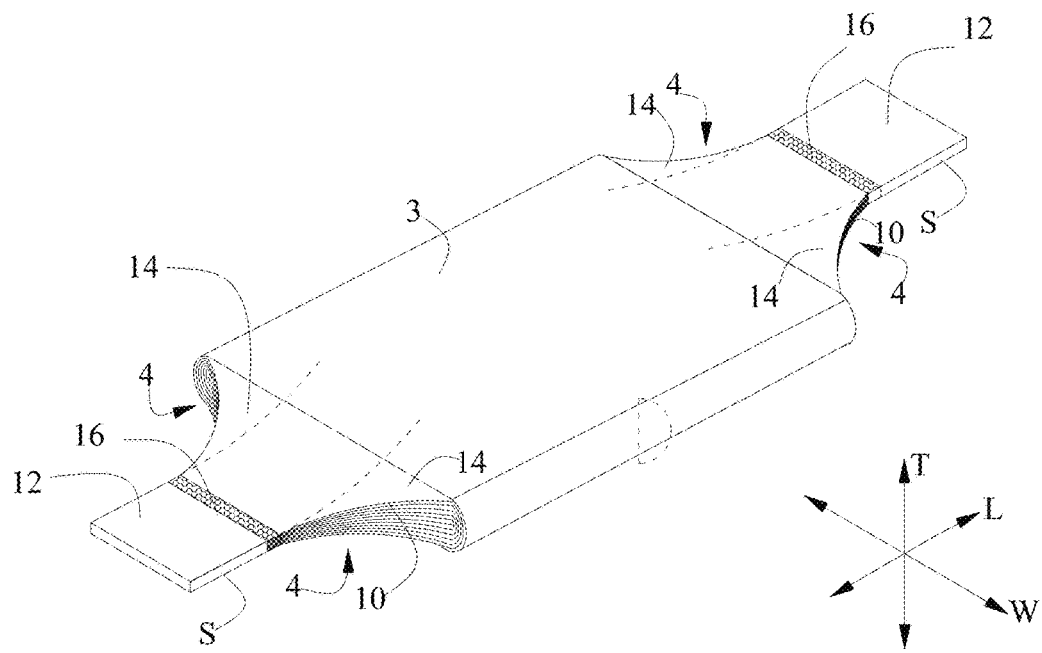
FIG. 1B is a perspective schematic view of FIG. 1A.
Figure 1C:
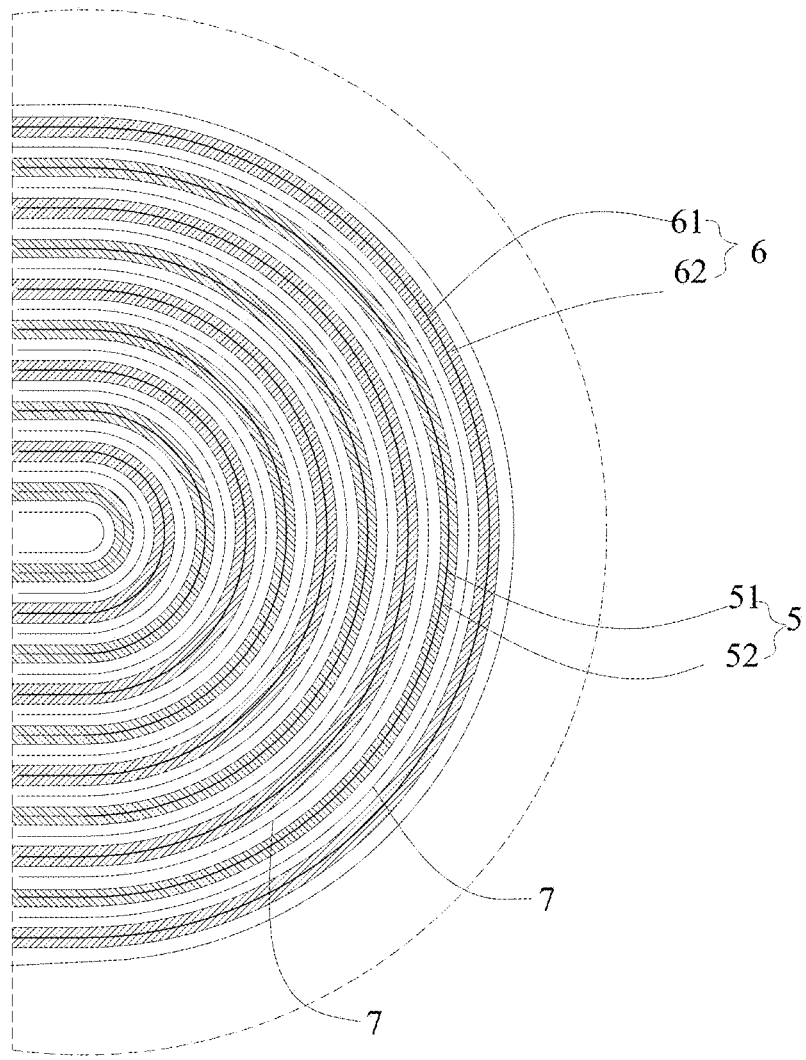
FIG. 1C is an enlarged schematic view of a part of FIG. 1B indicated by a dotted-line frame.

Reference numerals are represented as follows:
10 uncoated current collector
12 electrode tab
14 edge region
16, 18 weld zone
20 ellipse hole-like structure
22 circle hole-like structure
24 rectangle hole-like structure
30 battery top plate
32 connecting piece
3 cell main body portion
4 semi-closed channel
5 positive electrode plate
51 positive current collector
52 positive active material layer
6 negative electrode plate
61 negative current collector
62 negative active material layer
7 separator
S width direction side face
L length direction
W width direction
T thickness direction

DETAILED DESCRIPTION

Before description in detail, the content of the present disclosure is explained as follows. An uncoated current collector 10 of a positive electrode plate is a part of a positive current collector 51 of a positive electrode plate 5 and the part is not coated with a positive active material layer 52 on each of two surfaces thereof; similarly, an uncoated current collector 10 of a negative electrode plate is a part of a negative current collector 61 of a negative electrode plate 6 and the part is not coated with a negative active material layer 62 on each of two surfaces thereof; the uncoated current collector of the positive electrode plate and the uncoated current collector of the negative electrode plate are collectively indicated by the reference numeral 10; the layer number of the uncoated current collector is not limited, and may be selected according to, for example, energy density and thickness of a cell. A weld zone refers to a section of the uncoated current collector 10 which is engaged with a corresponding electrical conductive piece together when the uncoated current collector 10 is welded with the corresponding electrical conductive piece, after welded, every two adjacent layers of the uncoated current collector 10 are also engaged with each other at the weld zone. An all-closed channel refers to that a projection thereof onto a plane perpendicular to a thickness direction is closed, a semi-closed channel is a terminology relative to the all-closed channel, does not refer to be closed in half, but the semi-closed channel refers to a projection thereof onto a plane perpendicular to the thickness direction is not closed. In FIG. 1B to FIG. 8B, the extensions of width direction side faces S of the electrical conductive piece (in FIG. 1B to FIG. 8B, the electrical conductive piece is the electrode tab) are indicated by dotted lines, a region laterally positioned relative to each dotted line along the width direction W is an edge region of the uncoated current collector which is not aligned with the electrical conductive piece (indicated by reference numeral 14, based on description of background, the edge region is also referred to as an easy-folded region). In order to conveniently distinguish different applications of the electrical conductive piece, the electrode tab is indicated by reference numeral 12, but the connecting piece is indicated by reference numeral 32, and thus the weld zone corresponding to the electrode tab 12 is indicated by reference numeral 16, but the weld zone corresponding to the connecting piece 32 is indicated by reference numeral 18. When the semi-closed channel is not provided, the uncoated current collector after winding takes an approximate rectangular parallelepiped structure, a corner portion refers to a right-angle region of the uncoated current collector away from an active material layer region (that is, a cell main body portion 3), taking FIG. 8B and FIG. 9 and FIG. 10 for example, the corner portion is a region surrounded by two dotted lines in each of the upper left region, the upper right region, the lower left region and the lower right region. Although the figures of the present disclosure take the wound-type cell for example, but the present disclosure is not limited thereto, the technical concept of the present disclosure is also applicable to a laminated-type cell or a wound-laminated type cell.

Firstly, a cell according to a first aspect of the present disclosure is described.

A cell of a first aspect of the present disclosure comprises a positive electrode plate and a negative electrode plate which each are provided with an uncoated current collector, the uncoated current collector of the positive electrode plate and the uncoated current collector of the negative electrode plate each are welded with an electrical conductive piece used to connect with an external circuit; the uncoated current collector of the positive electrode plate is punched to form an electrolyte transmission channel and/or the uncoated current collector of the negative electrode plate is punched to form an electrolyte transmission channel; a punching manner for forming the electrolyte transmission channel comprises following one manner or two manners: one manner is that an edge region 14 of the uncoated current collector which is not aligned with the electrical conductive piece is punched to form a semi-closed channel 4, the other manner is that the uncoated current collector is punched to form a hole-like all-closed channel.

In the cell according to the first aspect of the present disclosure, by that the electrolyte transmission channel is formed in the uncoated current collector by punching, when the cell is applied to a battery, infiltration speed of the electrolyte is improved, at the same time rate performance and cycle performance of the battery are promoted. Moreover, the all-closed channel is wholly close to the active material region (that is, the cell main body portion 3) of the cell relative to the semi-closed channel 4, therefore a path of the electrolyte entering into the active material region can be shorten, that is, the electrolyte is easier to infiltrate the active material of the active material region.

Figure 2A:
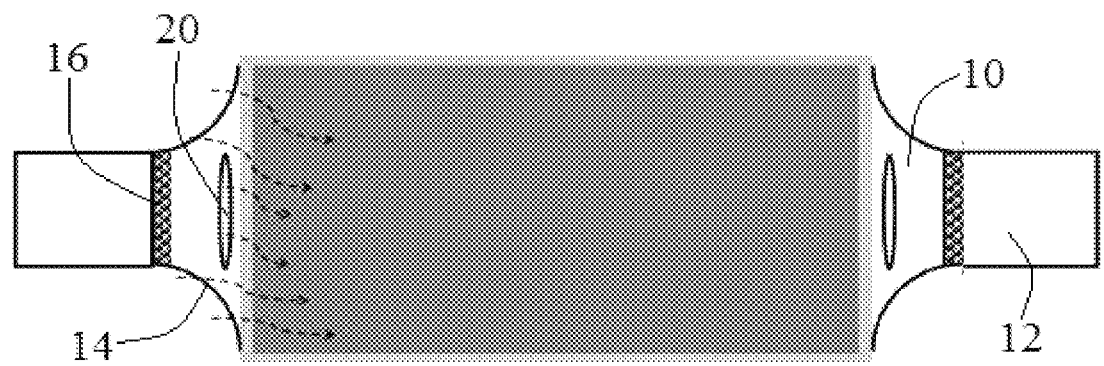
FIG. 2A is a structural schematic view of a cell of example 2 of the present disclosure.
Figure 2B:
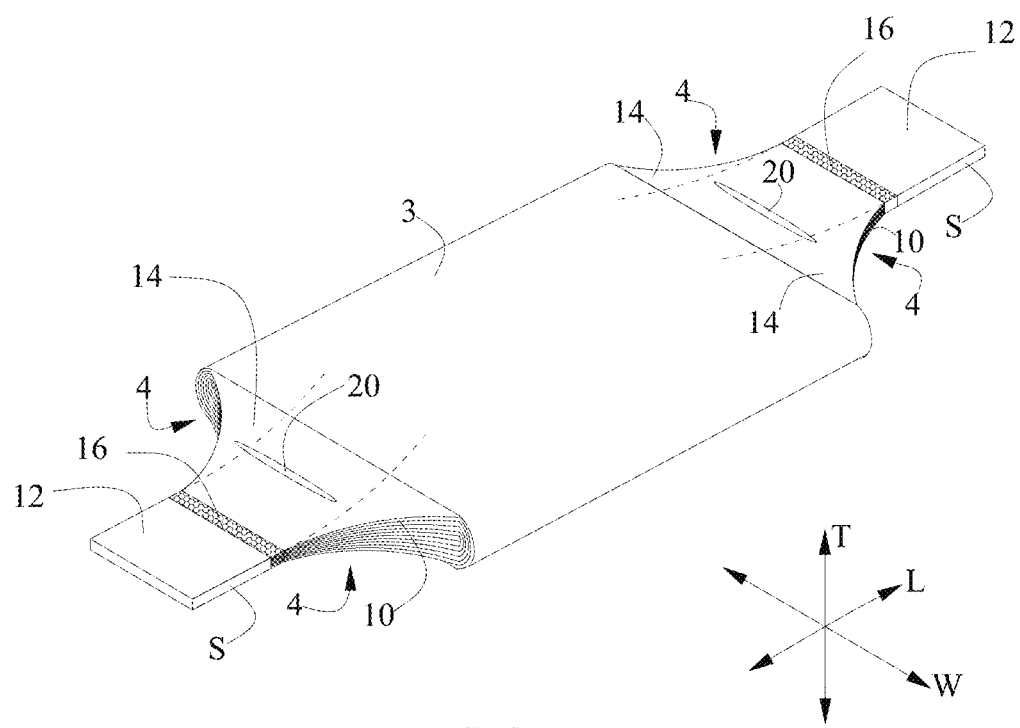
FIG. 2B is a perspective schematic view of FIG. 2A.
Figure 3A:
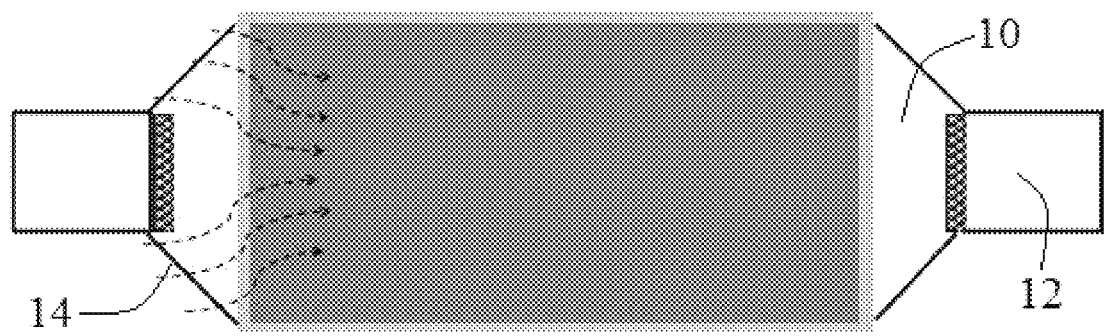
FIG. 3A is a structural schematic view of a cell of example 3 of the present disclosure.
Figure 3B:
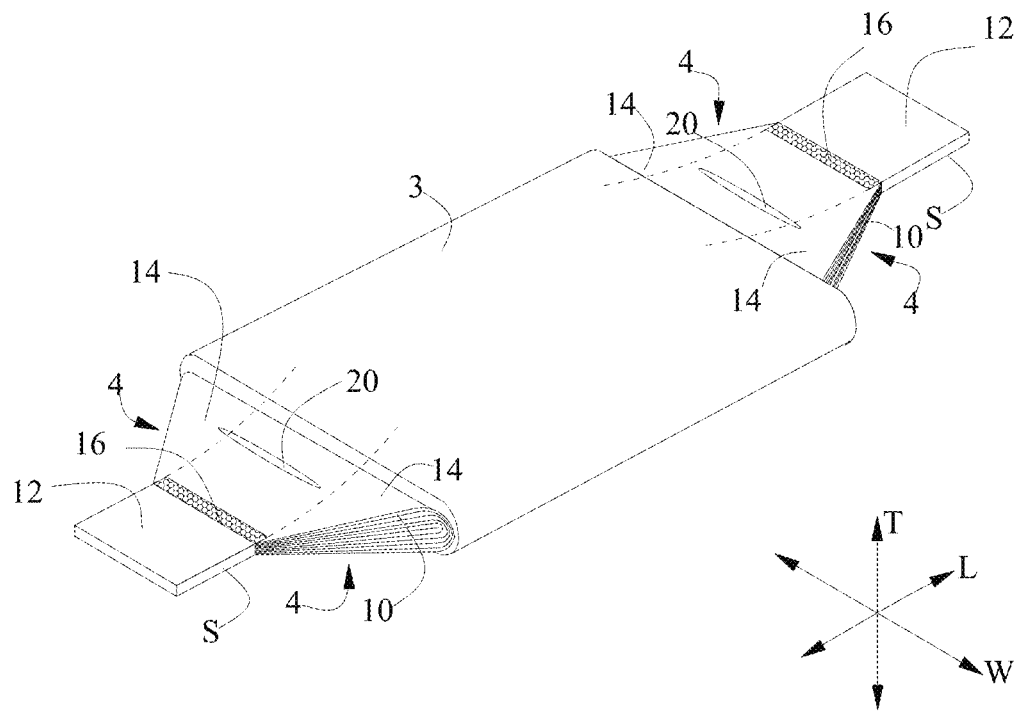
FIG. 3B is a perspective schematic view of FIG. 3A.
Figure 4A:
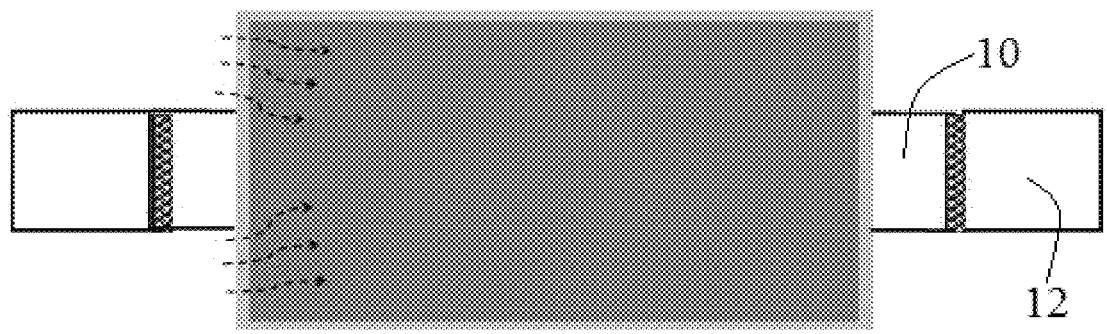
FIG. 4A is a structural schematic view of a cell of example 4 of the present disclosure.
Figure 4B:
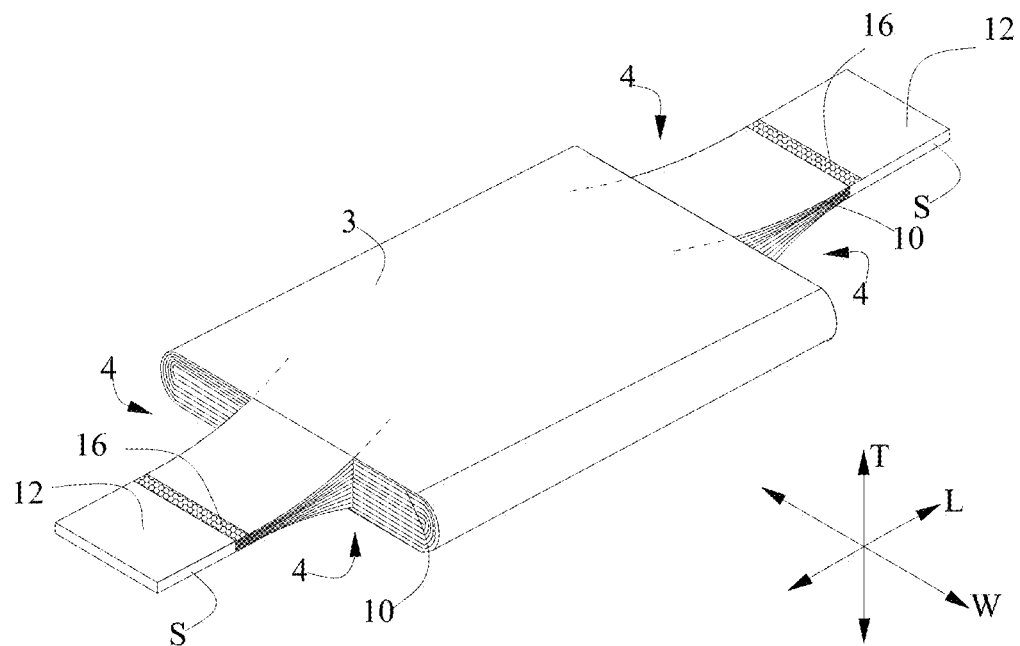
FIG. 4B is a perspective schematic view of FIG. 4A.

As an improvement of the cell of the present disclosure, the semi-closed channel 4 is a right-angle channel (as shown in FIG. 4A and FIG. 4B, that is, a projection of the semi-closed channel 4 onto a plane perpendicular to a thickness direction T is a right-angle shape), an inward concave arc shape channel (as shown in FIG. 1A, FIG. 1B, FIG. 2A and FIG. 2B, that is, a projection of the semi-closed channel 4 onto a plane perpendicular to the thickness direction T is an inward concave arc shape) or a triangular channel (as shown in FIG. 3A and FIG. 3B, that is, a projection of the uncoated current collector of the positive electrode plate and/or the uncoated current collector of the negative electrode plate onto a plane perpendicular to the thickness direction T is a trapezoidal shape and each oblique side of the trapezoidal shape is a projection of the semi-closed channel 4, so that each edge region 14 which is not aligned with the electrical conductive piece forms a triangular shape), which is formed by wholly or partially punching the edge region 14 of the uncoated current collector which is not aligned with the electrical conductive piece.

Figure 5A:
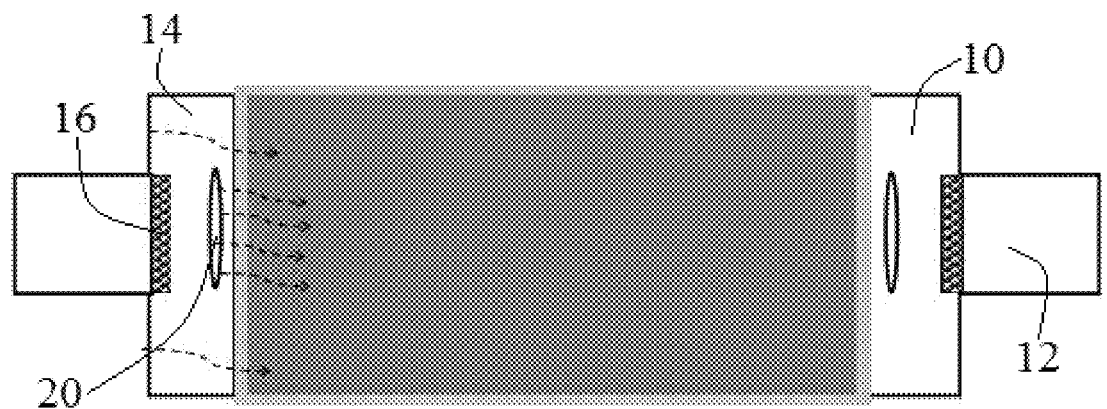
FIG. 5A is a structural schematic view of a cell of example 5 of the present disclosure.
Figure 5B:
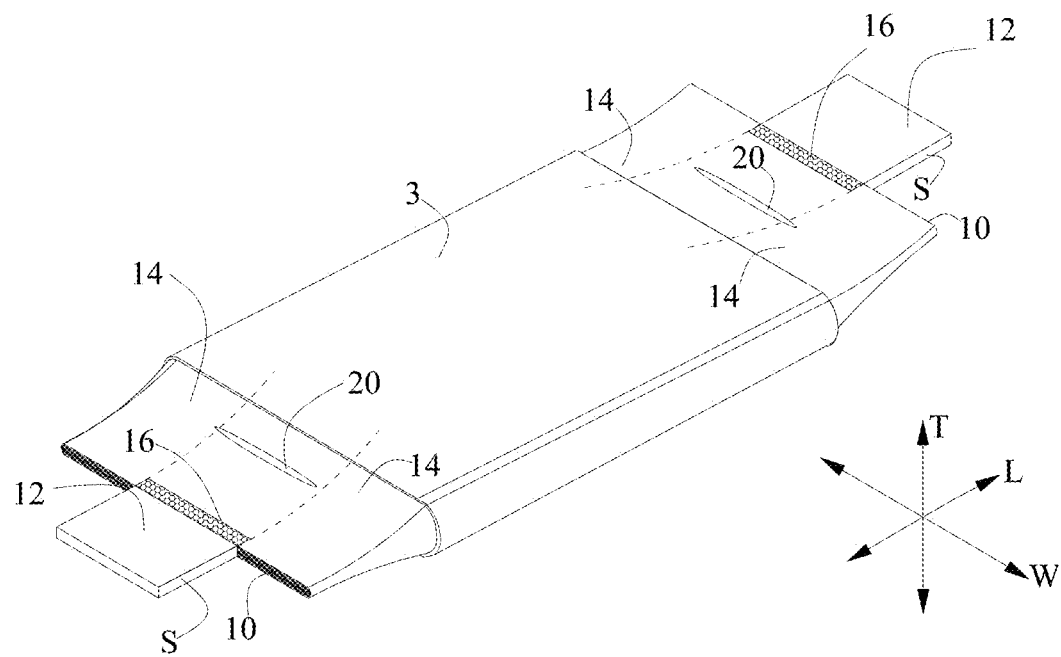
FIG. 5B is a perspective schematic view of FIG. 5A.
Figure 6A:
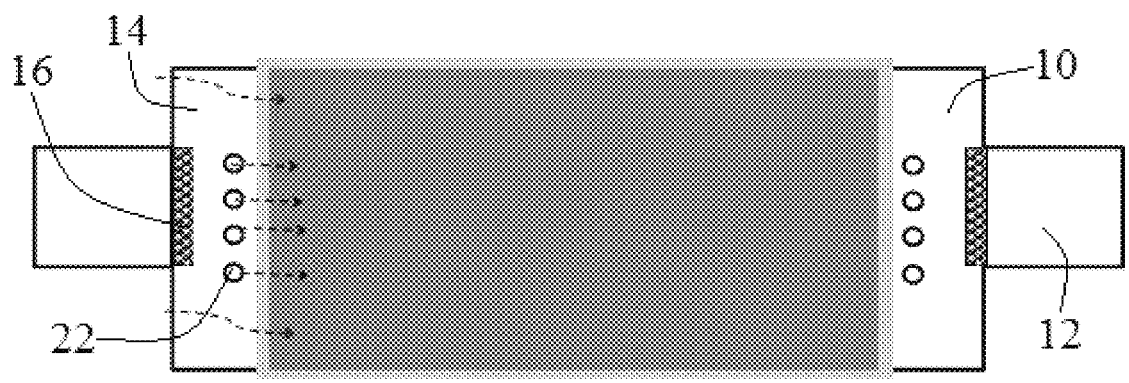
FIG. 6A is a perspective schematic view of a cell of example 6 of the present disclosure.
Figure 6B:
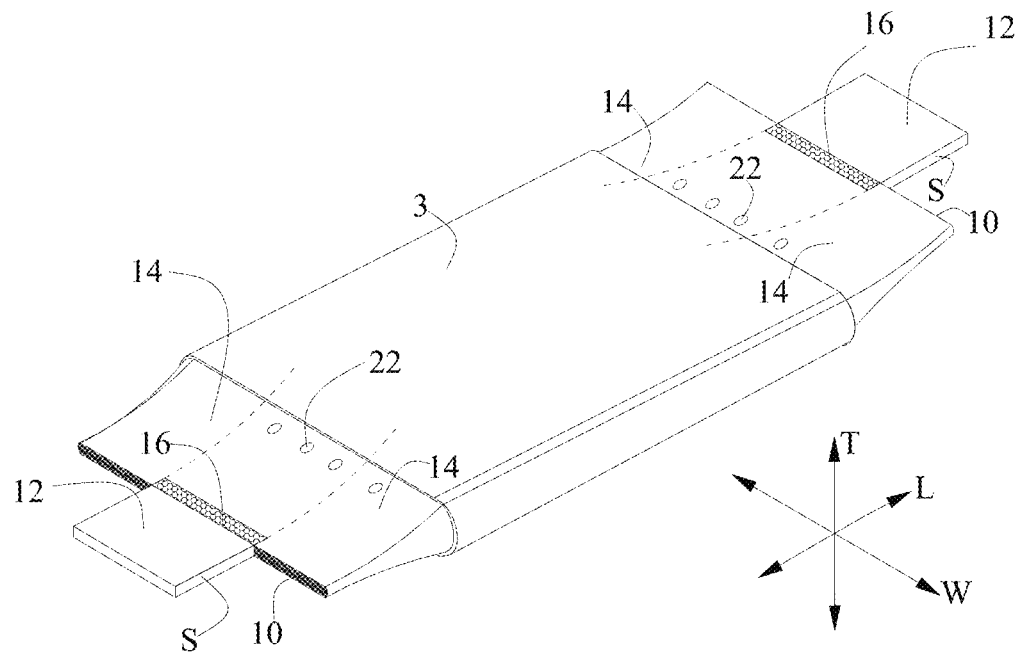
FIG. 6B is a perspective schematic view of FIG. 6A.
Figure 7A:
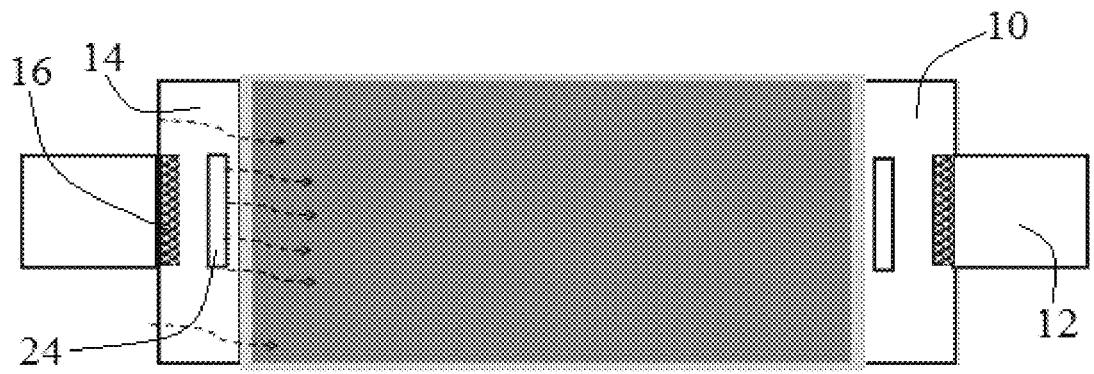
FIG. 7A is a structural schematic view of a cell of example 7 of the present disclosure.
Figure 7B:
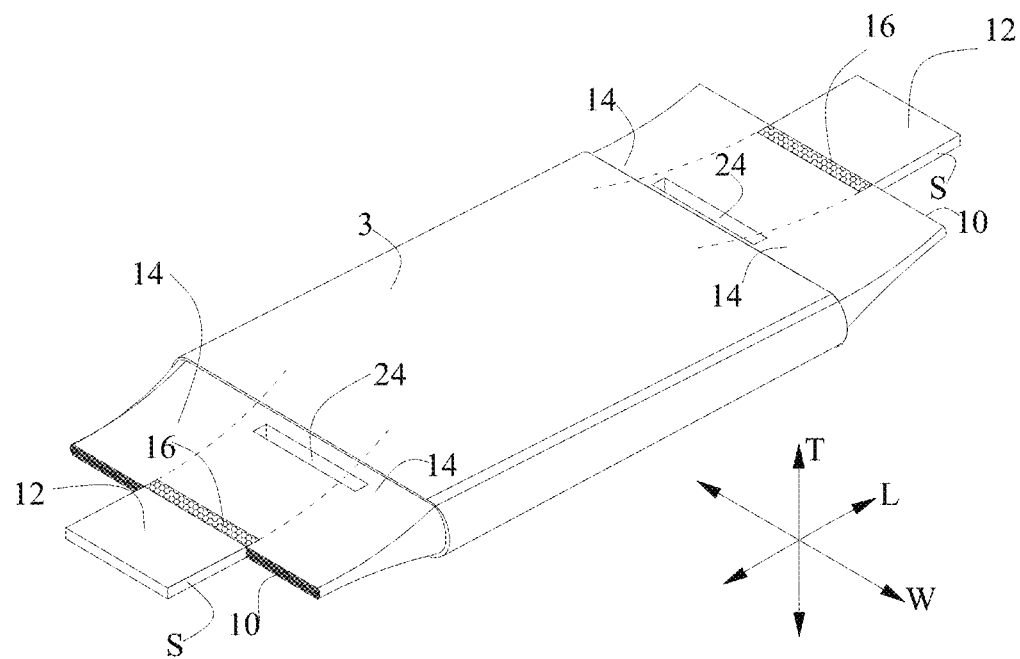
FIG. 7B is a perspective schematic view of FIG. 7A.
Figure 9:
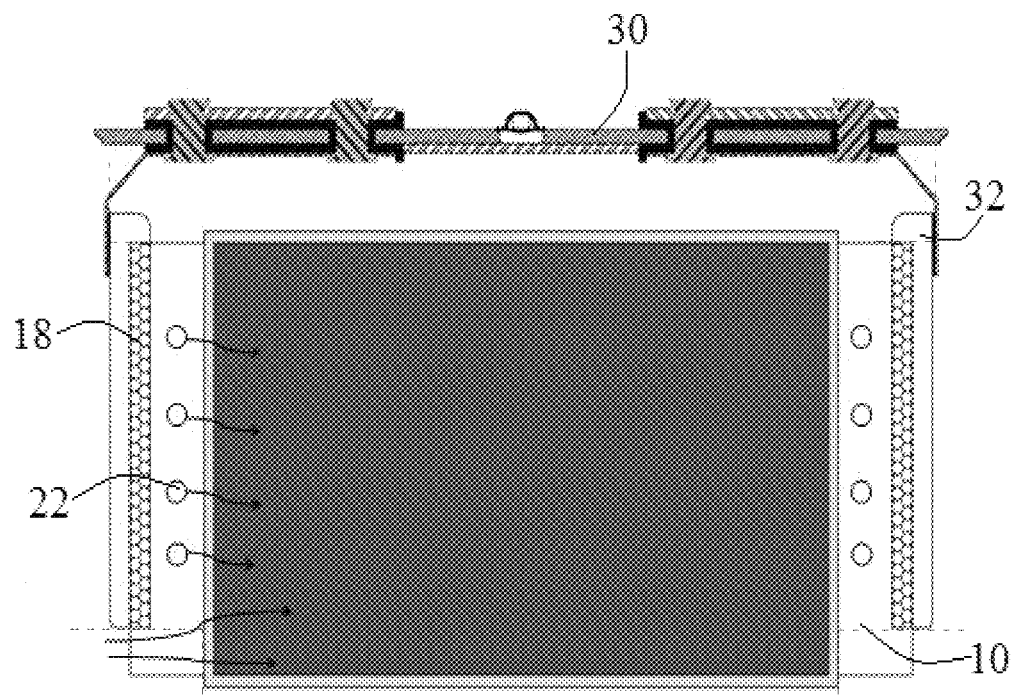
FIG. 9 is a structural schematic view of a cell of example 8 of the present disclosure.

As an improvement of the cell of the present disclosure, the hole-like all-closed channel is a circle hole-like structure 22 (as shown in FIG. 6A, FIG. 6B and FIG. 9, that is, a projection of the hole-like all-closed channel onto a plane perpendicular to the thickness direction T is a circle), an ellipse hole-like structure 20 (as shown in FIG. 2A, FIG. 2B, FIG. 3A, FIG. 3B, FIG. 5A and FIG. 5B, that is, a projection of the hole-like all-closed channel onto a plane perpendicular to the thickness direction T is an ellipse), a rectangle hole-like structure 24 (as shown in FIG. 7A and FIG. 7B, that is, a projection of the hole-like all-closed channel onto a plane perpendicular to the thickness direction T is a rectangle), a triangle hole-like structure (not shown, that is, a projection of the hole-like all-closed channel onto a plane perpendicular to the thickness direction T is a triangle) or a trapezoid hole-like structure (not shown, that is, a projection of the hole-like all-closed channel onto a plane perpendicular to the thickness direction T is a trapezoid).

As an improvement of the cell of the present disclosure, an area of the hole-like all-closed channel is 2%~10% of an area of the uncoated current collector before the uncoated current collector is punched.

As an improvement of the cell of the present disclosure, the hole-like all-closed channel is multiple hole-like structures arranged side by side (as shown in FIG. 6A, FIG. 6B and FIG. 9, that is, a projection of the hole-like all-closed channel onto a plane perpendicular to the thickness direction T is multiple holes arranged side by side).

As an improvement of the cell of the present disclosure, the hole-like all-closed channel is one rectangle hole-like structure (as shown in FIG. 7A and FIG. 7B, that is, a projection of the hole-like all-closed channel onto a plane perpendicular to the thickness direction T is a rectangle) or one ellipse hole-like structure 20 (as shown in FIG. 2A, FIG. 2B, FIG. 3A, FIG. 3B, FIG. 5A and FIG. 5B, that is, a projection of the hole-like all-closed channel onto a plane perpendicular to the thickness direction T is an ellipse), a long side of the rectangle is parallel to the weld zone or the long axis of the ellipse is parallel to the weld zone.

As an improvement of the cell of the present disclosure, the electrical conductive piece is the electrode tab 12 which may be positive or negative in polarity or the connecting piece 32 which is connected with the battery top plate and may be positive or negative in polarity.

As an improvement of the cell of the present disclosure, the cell is a wound-type cell, in which the electrolyte transmission channel in the uncoated current collector is formed by punching before winding of the cell is performed or the electrolyte transmission channel in the uncoated current collector is formed by punching after winding of the cell is performed, preferably the electrolyte transmission channel in the uncoated current collector is formed by punching once after winding of the cell is performed.

Secondly, a battery according to a second aspect of the present disclosure is described.

A battery according to a second aspect of the present disclosure comprises a battery case, a cell and an electrolyte, the cell and the electrolyte are packaged in the battery case, the cell is the cell according to the first aspect of the present disclosure.

As an improvement of the battery of the present disclosure, the battery case is a flexible packaging pouch, the electrical conductive piece is the electrode tab 12 which is positive or negative in polarity; or the battery case is a rigid packaging can, the electrical conductive piece is the connecting piece 32 which is connected with the battery top plate 30 and may be positive or negative in polarity.

Thirdly, a cell according to a third aspect of the present disclosure is described.

A cell of a third aspect of the present disclosure comprises a positive electrode plate and a negative electrode plate which each are provided with an uncoated current collector, the uncoated current collector of the positive electrode plate and the uncoated current collector of the negative electrode plate each are welded with an electrical conductive piece, the uncoated current collector of the positive electrode plate and the uncoated current collector of the negative electrode plate each are formed with a weld zone at a section thereof welded with the electrical conductive piece; at least one of the uncoated current collector of the positive electrode plate and the uncoated current collector of the negative electrode plate is provided with a hole-like all-closed channel penetrating the uncoated current collector along a thickness direction T, and the all-closed channel is positioned at an inner side of the weld zone along a length direction L, as shown in FIG. 2A, FIG. 2B, FIG. 3A, FIG. 3B, FIG. 5A, FIG. 5B, FIG. 6A, FIG. 6B, FIG. 7A, FIG. 7B and FIG. 9; and/or, at least one of the uncoated current collector of the positive electrode plate and the uncoated current collector of the negative electrode plate is provided with a semi-closed channel 4 penetrating a corner portion of the uncoated current collector along the thickness direction T, and the semi-closed channel 4 is positioned at a side of the weld zone along a width direction W, as shown in FIG. 1A, FIG. 1B, FIG. 2A, FIG. 2B, FIG. 3A, FIG. 3B, FIG. 4A and FIG. 4B.

In the cell according to the third aspect of the present disclosure, by that the uncoated current collector is provided with the all-closed channel and/or the semi-closed channel 4, when the cell is applied to the battery, infiltration speed of the electrolyte is improved, at the same time rate performance and cycle performance of the battery are promoted. Moreover, the all-closed channel is wholly close to the active material region (that is, the cell main body portion 3) of the cell relative to the semi-closed channel 4, therefore a path of the electrolyte entering into the active material region can be shorten, that is, the electrolyte is easier to infiltrate the active material of the active material region.

A projection of the hole-like all-closed channel onto a plane perpendicular to the thickness direction T is a circle (as shown FIG. 6A, FIG. 6B and FIG. 9 and is indicated by reference numeral 22), an ellipse (as shown in FIG. 2A, FIG. 2B, FIG. 3A, FIG. 3B, FIG. 5A and FIG. 5B and is indicated by reference numeral 20), a rectangle (as shown in FIG. 7A and FIG. 7B and indicated by reference numeral 24), a triangle (not shown) or a trapezoid (not shown).

In an embodiment, as shown in FIG. 6A, FIG. 6B and FIG. 9, a projection of the hole-like all-closed channel onto a plane perpendicular to the thickness direction T is multiple holes arranged side by side (indicated by reference numeral 22). A projection of the hole-like all-closed channel onto a plane perpendicular to the thickness direction T is a rectangle (as shown in FIG. 7A and FIG. 7B and indicated by reference numeral 24) and a long side of the rectangle is parallel to the weld zone 16, or a projection of the hole-like all-closed channel onto a plane perpendicular to the thickness direction T is an ellipse (as shown in FIG. 2A, FIG. 2B, FIG. 3A, FIG. 3B, FIG. 5A and FIG. 5B and as shown by reference numeral 20) and a long axis of the ellipse is parallel to the weld zone 16. Therefore, the hole-like all-closed channel may sufficiently adapt to a shape of the uncoated current collector 10 and allow a size thereof along width direction W to be maximum, so that a range that the electrolyte enters into the active material region can be increased.

In manufacturing, the hole-like all-closed channel may be formed by punching. In an embodiment, an area of the hole-like all-closed channel is 2%~10% of an area of the uncoated current collector before the uncoated current collector is punched. And thus on one hand, entering speed of the electrolyte is promoted; at the same time strength of the uncoated current collector is ensured.

In an embodiment, as shown in FIG. 1A to FIG. 7B and FIG. 9, the cell is a wound-type cell, the uncoated current collector of the positive electrode plate and the uncoated current collector of the negative electrode plate extend along the length direction L respectively toward opposite directions.

In an embodiment, a projection of the semi-closed channel 4 onto a plane perpendicular to the thickness direction T is an inward concave arc shape, as shown in FIG. 1A, FIG. 1B, FIG. 2A and FIG. 2B.

In another embodiment, a projection of the uncoated current collector of the positive electrode plate is a trapezoid and/or a projection of the uncoated current collector of the negative electrode plate onto a plane perpendicular to the thickness direction T is a trapezoid, as shown in FIG. 3A and FIG. 3B. At this time, an oblique side of the trapezoid is the projection of the semi-closed channel 4.

In comparison with the semi-closed channel 4 with a right-angle structure in FIG. 4A and FIG. 4B (that is, a projection onto a plane perpendicular to the thickness direction T is a right-angle shape), the semi-closed channel 4 employs a shape as shown in FIG. 1A, FIG. 1B, FIG. 2A and FIG. 2B or a shape as shown in FIG. 3A and FIG. 3B, which may ensure that the uncoated current collector has a larger overcurrent area. Moreover, when the semi-closed channel 4 employs the right-angle structure in FIG. 4A and FIG. 4B, the uncoated current collector 10 is easy to generate stress concentration at the right-angle position and in turn to be torn at the right-angle position when the uncoated current collector 10 is subjected to an external force, however when the semi-closed channel 4 employs the shape as shown in FIG. 1A, FIG. 1B, FIG. 2A and FIG. 2B or the shape as shown in FIG. 3A and FIG. 3B, because there is no 90 degrees corner of the right-angle structure, all the uncoated current collectors do not have the problem of stress concentration of the right-angle structure. Moreover, in comparison with the semi-closed channel 4 having the right-angle structure shown in FIG. 4A and FIG. 4B, when the all-closed channel (for example, the all-closed channel is the ellipse as shown in FIG. 2A, FIG. 2B, FIG. 3A and FIG. 3B) is further provided, it may further allow the all-closed channel to be made larger while it ensures that the uncoated current collector has a larger overcurrent area, so that infiltration speed of the electrolyte is faster. When the uncoated current collector 10 is cut in shape before winding of the cell is performed and then the cell is form by winding and the semi-closed channel 4 is formed, in comparison with the semi-closed channel 4 having the right-angle structure as shown in FIG. 4A and FIG. 4B, the semi-closed channel 4 employs the shape as shown in FIG. 1A, FIG. 1B, FIG. 2A and FIG. 2B or the shape as shown in FIG. 3A and FIG. 3B, because the remained uncoated current collector area is large after cutting and anti-deflecting capability is increased, so that during winding, the remained uncoated current collector after cut and the electrical conductive piece (the electrode tab 12 or the connecting piece 32) is not easy to fold.

The two electrical conductive pieces respectively are the positive electrode tab and the negative electrode tab or the two electrical conductive piece respectively are the positive connecting piece and the negative connecting piece which are connected with the battery top plate 30.

Preferably, the positive electrode tab is directly formed by the uncoated current collector of the positive electrode plate, the negative electrode tab is directly formed by the uncoated current collector of the negative electrode plate; the positive connecting piece is directly formed by the uncoated current collector of the positive electrode plate, the negative connecting piece is directly formed by the uncoated current collector of the negative electrode plate. Multiple layers of the uncoated current collector are laminated and ultrasonic welded together, so that the electrode tab or the connecting piece is formed. Of course, multiple layers of the uncoated current collector are laminated and ultrasonic welded together and then may be cut, so as to meet the requirement on a size of the electrode tab or the connecting piece.

Fourthly, a battery according to a fourth aspect of the present disclosure is described.

A battery according to a fourth aspect of the present disclosure comprises a battery case, a cell and an electrolyte, the cell and the electrolyte are packaged in the battery case, the cell is the cell according to the third aspect of the present disclosure.

In order to make the object, technical solutions and beneficial technical effects of the present disclosure more apparent, hereinafter in combination with figures and examples and comparative examples, the present disclosure is further described in detail. It should be understood that examples in the present disclosure are only to explain the present disclosure, and are not intended to limit the present disclosure.

Example 1

Preparation of a positive electrode plate: Li$(Ni_{1/3}Co_{1/3}Mn_{1/3})O_2$ (positive active material), acetylene black (conductive agent) and polyvinylidene fluoride (PVDF, binder) according to a mass ratio of 97:2:1 were uniformly mixed and N-methyl-2-pyrrolidone (NMP, solvent) was added to prepare a positive electrode slurry having a certain viscosity; the positive electrode slurry was uniformly coated on an aluminum foil (positive current collector), drying at 85° C. was performed and then cold-pressing and slicing were performed to obtain a positive electrode plate of a battery.

Preparation of a negative electrode plate: graphite (negative active material), acetylene black (conductive agent), carboxymethylcellulose sodium (CMC, thickening agent) and styrene-butadiene rubber (SBR, binder) according to a mass ratio of 96:2:1:1 were uniformly mixed to prepare a negative electrode slurry of a battery; the negative electrode slurry was uniformly coated on a copper foil (negative current collector), drying at 85° C. was performed and then cold-pressing and slicing were performed to obtain a negative electrode plate of a battery.

Preparation of a separator: polyethylene microporous film with a thickness of 16 μm was selected as a porous separator substrate, inorganic aluminum oxide powder, polyvinyl pyrrolidone and acetone (solvent) according to a mass ratio of 3:1.5:5.5 were uniformly mixed to prepare a slurry, and the slurry was coated on a surface of the porous separator substrate, drying was performed to form an inorganic coating; and then, polyvinylidene fluoride powder, acetone (solvent) and ethyl acetate according to a mass ratio of 10:35:55 were uniformly mixed to prepare a slurry, and the slurry was coated on two surfaces of the porous separator substrate which had been treated by the inorganic coating to form organic coatings, and the organic coatings on the two surfaces were consistent in weight and thickness.

Preparation of an electrolyte: lithium hexafluorophosphate was dissolved in a mixed solvent of ethylene carbonate, dimethyl carbonate and methyl ethyl carbonate (a volume ratio of ethylene carbonate, dimethyl carbonate and methyl ethyl carbonate was 1:2:1) to obtain a desired electrolyte.

Preparation of a cell: the positive electrode plate, the negative electrode plate and the separator were wound to prepare a cell, the uncoated current collector of the positive electrode plate and the uncoated current collector of the negative electrode plate were respectively positioned at two ends after winding of the cell was completed, because the present disclosure did not relate to the polarity in positive or negative, hereinafter the following description would be described without distinguishing the polarity in positive or negative. Please saw FIG. 1A, FIG. 1B and FIG. 1C, in the cell of the present example, the uncoated current collector of the positive electrode plate 10 and the uncoated current collector of the negative electrode plate 10 each were welded with the electrode tab 12 having corresponding polarity, the cell was connected with the external circuit via the electrode tabs 12 which had different polarity. Because the edge region of the uncoated current collector 10 which was not aligned with the electrode tab 12 was the easy-folded region 14 during forming of the cell, in order to avoid the uncoated current collector 10 being folded during forming of the cell, at the same time in order to leave more transmission channels for the electrolyte, each easy-folded region 14 of the uncoated current collector 10 was punched along an arc line to cut away a part thereof, so that each easy-folded region 14 became a semi-closed inward concave arc shape channel, so that the electrolyte might be transmitted to the positive electrode plate and the negative electrode plate along the arrows in the figure.

Preparation of a battery: the above cell was packaged, and then the electrolyte was injected, forming and degassing were performed, that was, a flexible packaging battery was obtained.

Example 2

Except the punching manner of the uncoated current collector 10, the present example was the same as example 1.

Please saw FIG. 2A and FIG. 2B, the difference of the present example from example 1 lied in that: in the present example, besides that the easy-folded region 14 was punched to form an inward concave arc shape channel, the uncoated current collector 10 was punched to form one all-closed ellipse hole-like structure 20 behind the weld zone 16 of the electrode tab 12 (referred to a region between the weld zone 16 and the cell main body portion 3, so did in the following examples), a long axis of the ellipse hole-like structure 20 was parallel to the weld zone 16, an area of the ellipse hole-like structure 20 was 6% of an area of the uncoated current collector 10 before the uncoated current collector 10 was punched, so as to ensure overcurrent capability.

Example 3

Except the punching manner of the uncoated current collector 10, the present example was the same as example 1.

Please saw FIG. 3A and FIG. 3B, the difference of the present example from example 1 lied in that: the present example, the easy-folded region 14 was not punched to form an inward concave arc shape channel, but was punched to form a semi-closed triangular channel.

Example 4

Except the punching manner of the uncoated current collector 10, the present example was the same as example 1.

Please saw FIG. 4A and FIG. 4B, the difference of the present example from example 1 lied in that: in the present example, the easy-folded region 14 was not punched to form an inward concave arc shape channel, but the whole easy-folded region 14 was wholly punched to form a right-angle channel.

Example 5

Except the punching manner of the uncoated current collector 10, the present example was the same as example 1.

Please saw FIG. 5A and FIG. 5B, the difference of the present example from example 1 lied in that: in the present example, the easy-folded region 14 was not punched, but the uncoated current collector 10 was punched to form one all-closed ellipse hole-like structure 20 behind the weld zone 16 of the electrode tab 12, a long axis of the ellipse hole-like structure 20 is parallel to the weld zone 16, an area of the ellipse hole-like structure 20 was 6% of an area of the uncoated current collector 10 before the uncoated current collector 10 was punched, so as to ensure overcurrent capability.

Example 6

Except the punching manner of the uncoated current collector 10, the present example was the same as example 1.

Please saw FIG. 6A and FIG. 6B, the difference of the present example from example 1 lied in that: in the present example, the easy-folded region 14 was not punched, but the uncoated current collector 10 was punched to form a row of four all-closed circle hole-like structures 22 behind the weld zone 16 of the electrode tab 12, the sum of areas of the circle hole-like structures 22 was 2% of an area of the uncoated current collector 10 before the uncoated current collector 10 was punched, so as to ensure overcurrent capability.

Example 7

Except the punching manner of the uncoated current collector 10, the present example was the same as example 1.

Please saw FIG. 7A and FIG. 7B, the difference of the present example from example 1 lied in that: in the present example, the easy-folded region 14 was not punched, but the uncoated current collector 10 was punched to form one all-closed rectangle hole-like structure 24 behind the weld zone 16 of the electrode tab 12, a long side of the rectangle hole-like structure 24 was parallel to the weld zone 16, an area of the rectangle hole-like structure 24 was 10% of an area of the uncoated current collector 10 before the uncoated current collector 10 was punched, so as to ensure overcurrent capability.

Comparative Example 1

Figure 8A:
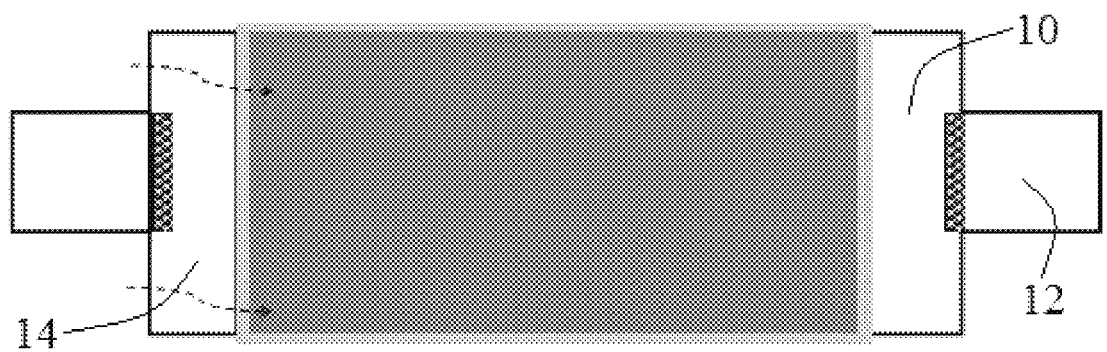
FIG. 8A is a structural schematic view of a cell of comparative example 1 of the present disclosure.
Figure 8B:
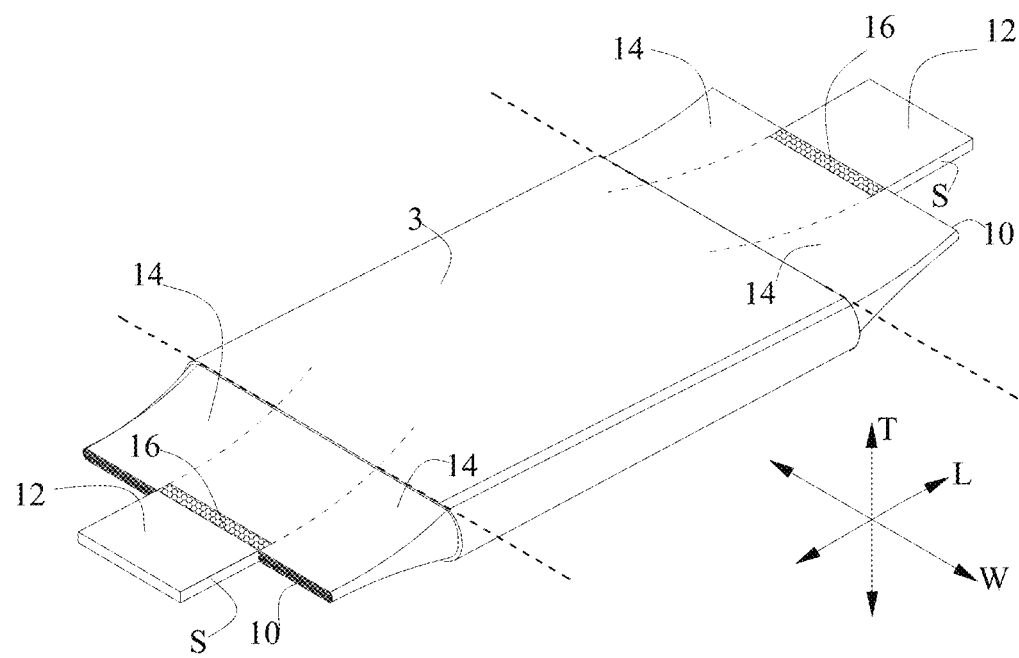
FIG. 8B is a perspective schematic view of FIG. 8A.

Please saw FIG. 8A and FIG. 8B, except that the uncoated current collector 10 was not punched and all the easy-folded regions 14 were remained, the present comparative example was the same as example 1.

Example 8

Please saw FIG. 9, the difference of the present example from example 1 lied in: firstly, the battery of the present example was a rigid can battery, both the uncoated current collector of the positive electrode plate 10 and the uncoated current collector of the negative electrode plate 10 each were not welded with an electrode tab 12, but respectively were directly welded with the positive connecting piece 32 and the negative connecting piece 32 which were connected with the battery top plate 30, the connecting pieces 32 were connected with an external circuit; secondly, the punching manner of each uncoated current collector 10 was that each uncoated current collector 10 was punched to a row of four all-closed circle hole-like structures 22 behind the weld zone 18 of the corresponding connecting piece 32; the sum of areas of the row of the four circle hole-like structures 22 was 3% of an area of the uncoated current collector 10, so as to ensure overcurrent capability.

The positive electrode plate, the negative electrode plate, the separator, electrolyte and the like employed in the present example were the same as those of example 1, the description thereof was omitted.

Preparation of a battery: the above cell was packaged, and then the electrolyte was injected, forming and degassing were performed, that was, a rigid can battery was obtained.

Comparative Example 2

Figure 10:
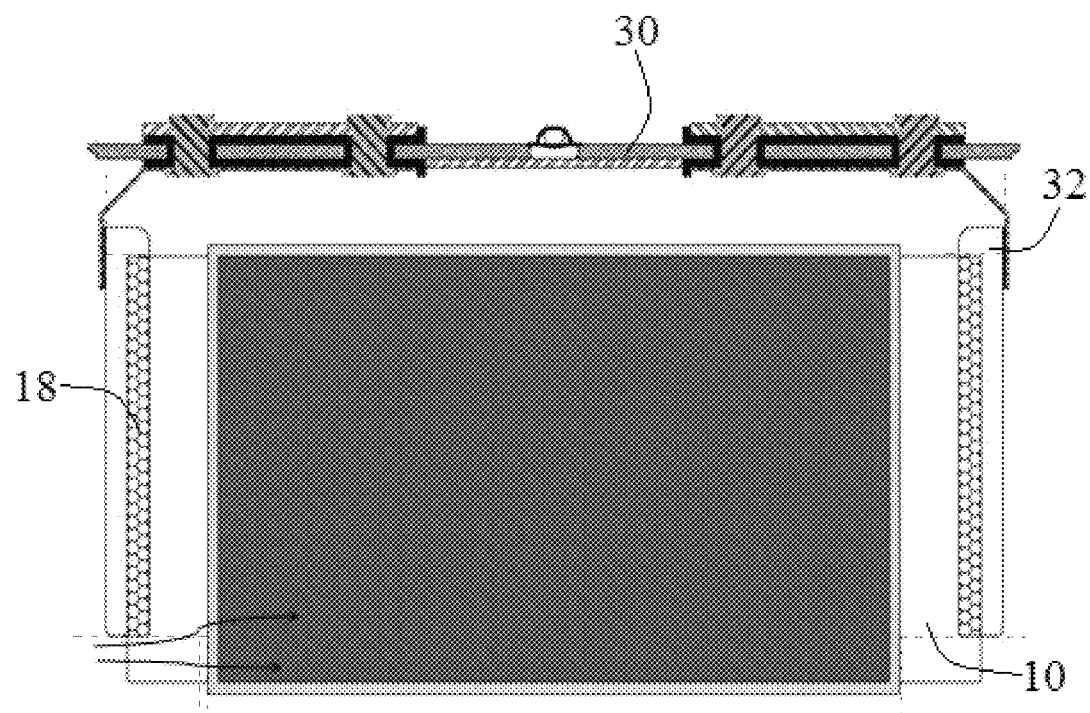
FIG. 10 is a structural schematic view of a cell of comparative example 2 of the present disclosure.

Please saw FIG. 10, except that the uncoated current collector 10 was not punched and the uncoated current collector 10 behind the weld zone 18 was remained as the original in preparation of a cell, the present comparative example was the same as example 8.

It was be noted that, the present disclosure, in each example, each hole-like all-closed channel formed behind the weld zone of the electrical conductive piece by punching the uncoated current collector, such as the ellipse hole-like structure 20, the circle hole-like structure 22 and the rectangle hole-like structure 24, a characteristic size thereof was 1~10 millimeter.

Performance test of the cell and the battery of each of examples and comparative examples In order to characterize on improvement of infiltration performance of the electrolyte of the cell and the cycle performance of the battery in the present disclosure, the cell and the battery of each of examples and comparative examples were performed on the following tests and the test results were listed in table 1.

1) the cell was immersed in the electrolyte for 5 hours, and then the cell was taken out and drying the cell at 90° C. was performed, whether the drying was finished was judged based on whether the internal resistance of the cell was larger than 100 MΩ, if the internal resistance of the cell was larger than 100 MΩ, it was shown that the drying was finished, the drying time of each cell was recorded.

2) 3 C charging rate test on the cell was performed and the time required for 3 C charging to 80% SOC was recorded.

3) cycle performance test: the battery at 60° C. and 2 C/3 C for 800 cycles was performed, capacity retention rate of the battery was determined. In cycle test, voltage range was 2.8V~4.2V, charging was performed at 2 C rate, discharging was performed at 3 C rate, cycle capacity retention rate was a percentage between the 3 C discharging capacity at the $800^{th}$ cycle and discharging capacity at the second cycle.

TABLE 1 test results of each of examples and comparative examples

|  | Drying time of the cell after fully immersed (h) | The time required for 3 C charging to 80% SOC (min) | Capacity retention rate at 60° C. and 2 C/3 C for 800 cycles |
|---|---|---|---|
| Example 1 | 5 | 12 | 85.56% |
| Example 2 | 13 | 9 | 86.89% |
| Example 3 | 14 | 17 | 83.13% |
| Example 4 | 15 | 15 | 84.36% |
| Example 5 | 17 | 18 | 82.12% |
| Example 6 | 20 | 16 | 80.94% |
| Example 7 | 18 | 17 | 82.21% |
| Comparative example 1 | 28 | 23 | 75.59% |
| Example 8 | 22 | 15 | 83.43% |
| Comparative example 2 | 36 | 19 | 77.01% |

As could be seen from the test results of table 1: infiltration speed of the electrolyte to the cell in the present disclosure was significantly promoted; when the electrolyte transmission channel of the cell was increased, the charging rate of the battery was obviously improved, at the same time the cycle performance of the battery was beneficially improved.

In conclusion, in the present disclosure, with the premise that the uncoated current collector of the cell is ensured to have sufficient overcurrent capability, by that the easy-folded region is punched to form an electrolyte channel and/or the uncoated current collector behind the weld zone of the electrical conductive piece is punched to form an electrolyte channel, on one hand, it can effectively prevent the easy-folded region from being folded to block electrolyte transmission, on the other hand, the electrolyte transmission channel behind the weld zone of the electrode tab/the connecting piece obstructed by the weld zone of the electrode tab/the connecting piece is opened up, so that infiltration speed of the electrolyte to the electrode plates is significantly promoted, standby infiltration time is significantly reduced after the electrolyte is injected into the cell, at the same time, it can ensure electrolyte retention capability of the cell in later-stage of the cycle, the cycle performance of the cell is effectively improved. Moreover, the punching process of the cell of the present disclosure is simple, therefore the present disclosure can be widely and rapidly applied to various batteries.

According to disclosure and teaching of the above description, a person skilled in the art of the present disclosure may further make appropriate change and modification to the above implementing manners. Therefore, the present disclosure is not limited to the implementing manners disclosed and described as above, some modifications and changes made to the present disclosure shall be also fallen within the protect scope of the claims of the present disclosure. Moreover, although the present description uses some specific terminologies, these terminologies are only for convenient description and are not used to limit the present disclosure.

What is claimed is:

1. A cell, comprising a positive electrode plate and a negative electrode plate which each are provided with an uncoated current collector, the uncoated current collector of the positive electrode plate and the uncoated current collector of the negative electrode plate each being welded with an electrical conductive piece, the uncoated current collector of the positive electrode plate and the uncoated current collector of the negative electrode plate each being formed with a weld zone at a section thereof welded with the electrical conductive piece;

wherein at least one of the uncoated current collector of the positive electrode plate and the uncoated current collector of the negative electrode plate is provided with a hole-like all-closed channel penetrating the uncoated current collector along a thickness direction, and the hole-like all-closed channel is positioned at an inner side of the weld zone along a length direction; and/or, at least one of the uncoated current collector of the positive electrode plate and the uncoated current collector of the negative electrode plate is provided with a semi-closed channel penetrating a corner portion of the uncoated current collector along the thickness direction, and the semi-closed channel is positioned at a side of the weld zone along a width direction.

2. The cell according to claim 1, wherein a projection of the hole-like all-closed channel onto a plane perpendicular to the thickness direction is a circle, an ellipse, a rectangle, a triangle or a trapezoid.

3. The cell according to claim 1, wherein a projection of the hole-like all-closed channel onto a plane perpendicular to the thickness direction is multiple holes arranged side by side.

4. The cell according to claim 1, wherein a projection of the hole-like all-closed channel onto a plane perpendicular to the thickness direction is a rectangle and a long side of the rectangle is parallel to the weld zone, or a projection of the hole-like all-closed channel onto a plane perpendicular to the thickness direction is an ellipse and a long axis of the ellipse is parallel to the weld zone.

5. The cell according to claim 1, wherein the hole-like all-closed channel are formed by punching.

6. The cell according to claim 5, wherein an area of the hole-like all-closed channel is 2%-10% of an area of the uncoated current collector before the uncoated current collector is punched.

7. The cell according to claim 1, wherein the cell is a wound-type cell, the uncoated current collector of the positive electrode plate and the uncoated current collector of the negative electrode plate extend along a length direction respectively toward opposite directions.

8. The cell according to claim 1, wherein a projection of the uncoated current collector of the positive electrode plate onto a plane perpendicular to the thickness direction is a trapezoid and/or a projection of the uncoated current collector of the negative electrode plate onto a plane perpendicular to the thickness direction is a trapezoid.

9. The cell according to claim 1, wherein a projection of the semi-closed channel onto a plane perpendicular to the thickness direction is an inward concave arc shape.

10. The cell according to claim 1, wherein the two electrical conductive piece respectively are a positive electrode tab and a negative electrode tab, or the two electrical conductive piece respectively are a positive connecting piece and a negative connecting piece which are connected with a battery top plate.

11. A battery, comprising a battery case, a cell and an electrolyte, the cell and the electrolyte being packaged in the battery case;

the cell comprising a positive electrode plate and a negative electrode plate which each are provided with an uncoated current collector, the uncoated current collector of the positive electrode plate and the uncoated current collector of the negative electrode plate each being welded with an electrical conductive piece, the uncoated current collector of the positive electrode plate and the uncoated current collector of the negative electrode plate each being formed with a weld zone at a section thereof welded with the electrical conductive piece;

wherein at least one of the uncoated current collector of the positive electrode plate and the uncoated current collector of the negative electrode plate is provided with a hole-like all-closed channel penetrating the uncoated current collector along a thickness direction, and the hole-like all-closed channel is positioned at an inner side of the weld zone along a length direction; and/or, at least one of the uncoated current collector of the positive electrode plate and the uncoated current collector of the negative electrode plate is provided with a semi-closed channel penetrating a corner portion of the uncoated current collector along the thickness direction, and the semi-closed channel is positioned at a side of the weld zone along a width direction.

12. The battery according to claim 11, wherein a projection of the hole-like all-closed channel onto a plane perpendicular to the thickness direction is a circle, an ellipse, a rectangle, a triangle or a trapezoid.

13. The battery according to claim 11, wherein a projection of the hole-like all-closed channel onto a plane perpendicular to the thickness direction is multiple holes arranged side by side.

14. The battery according to claim 11, wherein a projection of the hole-like all-closed channel onto a plane perpendicular to the thickness direction is a rectangle and a long side of the rectangle is parallel to the weld zone, or a projection of the hole-like all-closed channel onto a plane perpendicular to the thickness direction is an ellipse and a long axis of the ellipse is parallel to the weld zone.

15. The battery according to claim 11, wherein the hole-like all-closed channel are formed by punching.

16. The battery according to claim 15, wherein an area of the hole-like all-closed channel is 2%-10% of an area of the uncoated current collector before the uncoated current collector is punched.

17. The battery according to claim 11, wherein the cell is a wound-type cell, the uncoated current collector of the positive electrode plate and the uncoated current collector of the negative electrode plate extend along a length direction respectively toward opposite directions.

18. The battery according to claim 11, wherein a projection of the uncoated current collector of the positive electrode plate onto a plane perpendicular to the thickness direction is a trapezoid and/or a projection of the uncoated current collector of the negative electrode plate onto a plane perpendicular to the thickness direction is a trapezoid.

19. The battery according to claim 11, wherein a projection of the semi-closed channel onto a plane perpendicular to the thickness direction is an inward concave arc shape.

20. The battery according to claim 11, wherein the two electrical conductive piece respectively are a positive electrode tab and a negative electrode tab, or the two electrical conductive piece respectively are a positive connecting piece and a negative connecting piece which are connected with a battery top plate.

* * * * *